Sept. 27, 1949.   E. G. MILLER ET AL   2,483,322
MOTOR OPERATED VALVE

Filed Feb. 18, 1943   4 Sheets-Sheet 4

INVENTORS:
RALPH E. ENGBERG,
EDWARD G. MILLER,

ATTORNEYS.

Patented Sept. 27, 1949

2,483,322

UNITED STATES PATENT OFFICE 2,483,322

MOTOR OPERATED VALVE

Edward G. Miller and Ralph E. Engberg, Clayton, Mo., assignors to Alco Valve Company, Maplewood, Mo., a corporation of Missouri Application February 18, 1943, Serial No. 476,278

31 Claims. (Cl. 137—139)

The present invention relates to a motor operated valve, and more particularly to a valve of this type which is opened and closed by a motor, with a limit switch operable to cut off the motor at each end of the stroke, and with manual means for operating the valve when the power is off.

An object of the invention is to provide a valve of this type with a single limit switch enclosed in the valve unit, which limit switch is caused to assume alternate positions when the valve is in its open and closed positions, regardless of the means by which the valve is moved into said positions.

A further object is to provide a detent mechanism cooperable with the limit switch mechanism, which will hold the valve in its particular extreme position.

A further object is to provide a valve of this type that is self phasing. That is to say, any positioning of the valve in either of its extreme positions will preset the circuit for movement in the other direction upon external operation of the circuit. Hence, a particular object is to provide a motor operated valve which, when manually operated, will be positioned for subsequent automatic operation in the same manner as if the manual operation had been automatic.

A further object is to provide a locking device which automatically locks the valve in open or closed position, but does not prevent operation of the valve either electrically or manually.

Further objects include the provision of an indicator showing the position of the valve; means to insure tight sealing of the valve and long life; and adjustment means for varying the locking pressure operable from the outside of the valve.

Other objects are to provide a valve that is small in size and light in weight with the elimination of mechanical elements in the flow area subject to sticking by gummy deposits; to provide a valve having great adaptability to varying rates of flow in pressure, a valve free of packings and a valve that is explosion proof.

It is also an object to provide a valve that can be operated in any position, and upon voltages ranging within the normal valve voltage, as from 6 to 110 volts A. C. or D. C.

The valve comprises generally a valve housing 30, having an inlet 31, an outlet 32, and a bridge member 33 separating the inlet and the outlet. The bridge is provided with a valve-seat insert 34.

A valve assembly is adapted to move to open and close with respect to the valve seat 34. It includes a valve stem 36 having a threaded lower end 37. Beyond the threads is a guide pin 38 engaging in a guide sleeve in the housing 30. The opposite end of the valve stem 36 has an enlarged portion 39 and finally a head 40.

A detent sleeve 41 engages over the larger portion 39 of the stem 36, and bears against the head 40. A bellows sealing disc 42 is slipped over the smaller end of the valve stem 36 up against the sleeve 41, adjacent to the shoulder of the larger portion 39. A shim of suitable thickness is then slipped over the end of the valve stem, followed by a valve disc 35. A first nut 43 is drawn to clamp the valve disc 35, the sleeve 41, and the bellows head 42 onto the valve stem 36. A cup-shaped flow deflector 44 is engaged outside of the nut 43, and finally a second nut 45 acts as a lock nut and also clamps the flow deflector 44 into position. The rim of the flow deflector is pressed into the seal of rubber or the like, disposed about the edge of the valve disc 35. This seal also cooperates with the valve seat 34 to effect closure of the valve.

A bellows 46 is sealed against the head 42 at one end, and at its other end is sealed to a partition 47 across the end of the housing 30. The partition 47 has a central opening therein, into which the end of the bellows is secured.

The detent sleeve 41 has an enlarged hollow portion 51 with opposed slots 52 extending axially therealong for a limited distance. These slots receive pins 53 securely driven into an internally threaded nut 54 disposed within the interior of the sleeve 41. A spring 55 acts on one side of the nut 54, and a spring 56 on the opposite side. It will be seen that as the nut shifts to the left in Fig. 3, it will urge the valve closed by applying pressure through the spring 55. This spring can take up any over-travel of the nut. In similar fashion, shifting of the nut to the right in Fig. 3 opens the valve by transmitting force through the spring 56. The springs are normally put under an initial compression and are arranged to balance each other.

Figure 6:
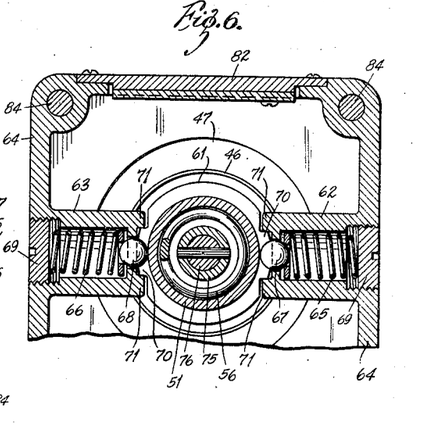
Fig. 6 is a transverse section taken on the line 6—6 at the middle of Fig. 3.
Figure 7:
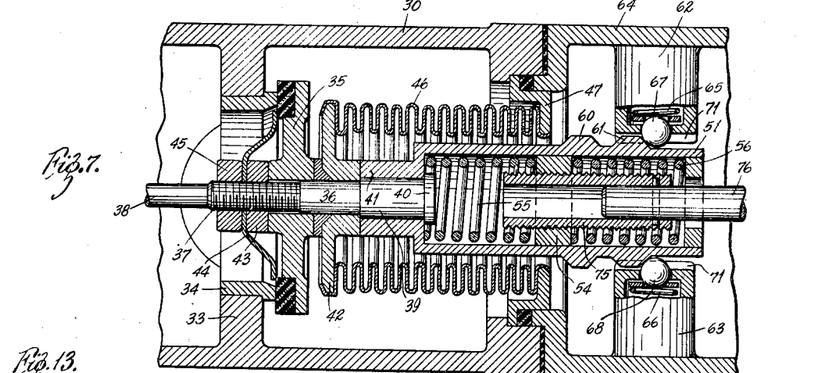
Fig. 7 is a partial longitudinal section taken at 90° to Fig. 3.

Movement of the sleeve 41, and, hence of the valve, is controlled by a detent mechanism, shown more particularly in Figs. 6 and 7. To this end, the sleeve 41 has spaced ridges 60 and 61 therearound separated by a groove. The ridges 60 and 61 have sloping sides. They extend around the sleeve 41, but are cut away in parts, as will be shown. It is desirable that the right side of the slope be relatively steep to obtain easier and faster closing of the valve. However, a steep slope obstructs movement of the valve. Hence, a steep slope of 45° may be used on the right side of ridge 61, to insure good closing action, and a lesser slope of 38° is recommended for the left side to reduce the load required for initial displacement of the valve into the closing direction.

Two bosses 62 and 63 extend radially inward from an intermediate housing member 64. The bosses contain detent springs 65 and 66, respectively, acting in familiar manner against detent balls 67 and 68. The springs are held in the bosses by threaded caps 69, which are adjustably positioned to apply predetermined compression to the springs. Upon movement of the sleeve, the balls 67 and 68 will compress their respective springs to accommodate the ridge 61 and will expand when the sleeve displaces the ridge 61 to one side or the other of the balls, and exert force upon the sleeve to urge it in one or the other direction. This mechanism causes the valve to be locked in either of its extreme positions.

As heretofore noted, the ridges 60 and 61 are cut away (Fig. 6) to provide axial ridges 70. The bosses have projections 71 which, by engagement with the portions 70, permit axial, but prevent rotary movement of the sleeve.

The nut 54 within the hollow sleeve portion 51, is threaded onto a jack screw 75. This screw, in turn, is pinned to a motor shaft 76 operated by a motor disposed within the motor housing 77. The motor is any of the reversible types suitable for this sort of operation, as is well known in the art.

A limit switch for controlling operation of the motor is shown at 80. This limit switch has a pivoted operating trigger 81 normally urged toward the axis of the motor shaft. This trigger 81 is displaced by the ridge 61, the limit switch being disposed 90° around the shaft from the detents as shown in Fig. 6.

The limit switch is mounted upon a plate 82 secured to the side wall of an intermediate housing 64. Bolts 84 are passed between the motor housing 77 and the valve housing 30 to clamp them on opposite ends of the intermediate housing 64. The trigger 81 causes the limit switch to assume one of two positions, the switch being a single pole double-throw switch, preferably of the snap-action type with negative differential. (A commercial model switch of this type is General Electric type CR–1070C100A3). As the valve moves toward open position, on that shown in Fig. 3, the ridge 61 will move under the trigger 81, and, at a predetermined point in the passage of the sloping side of the ridge 61 under the trigger, the latter will shift the switch from a first position to a second position. Upon reverse movement, the ridge will move out from th trigger, permitting the latter to slide down the slope to a point beyond its first point of shift before returning to its first position.

Figure 21:
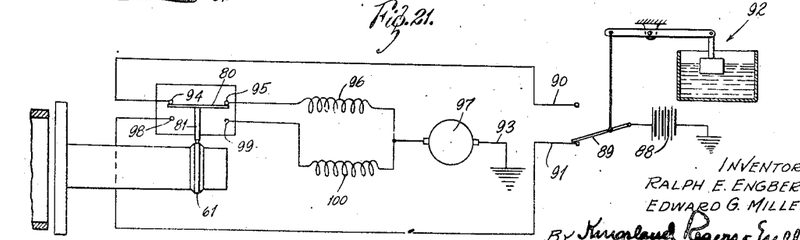
Fig. 21 (Sheet 1) is a wiring diagram of the mechanism.

From the foregoing, it will be seen that the valve will be operated by rotation of the motor shaft in one or the other of its directions. Fig. 21 shows a typical circuit of the motor. A source of power is shown at 88. A single pole double-throw switch 89 connects the source of power alternately to a wire 90 and a wire 91. This switch 89 is operated from some external means, generally indicated at 92. The means 92 may be a float or it may be any device which is actuated manually or automatically to one position when it is desired to have flow, and into the other position when it is desired to stop the flow.

The wire 90 leads into one terminal 94 of the limit switch 80. When the limit switch is in one position, as shown in Fig. 21, it connects the terminal 94 with the terminal 95 which, in turn, is connected to a winding 96 for the series wound motor 97 and ultimately back by a line 93 to the source of power. The winding 96 produces rotation of the motor in one direction, here shown as being the direction to close the valve.

The wire 91 leads to another terminal 98 which, when engaged by the limit switch in its opposite position, is connected to the terminal 99 leading to a winding 100 for the motor. This winding 100 reverses the direction of movement of the motor.

In the device itself, the leads, ordinarily comprising the wires 90, 91 and 93, are brought in through a plug 101 secured to the intermediate housing 64. The three terminals are shown on this plug without the connections to the limit switch and motor.

From the diagram it will be seen that the limit switch will always be in a position to cause the motor to operate to open the valve whenever the valve is closed or to close the valve whenever it is open, regardless of what means has been employed to cause the valve to assume either of its positions. As will be seen, the valve can be operated manually, but, by virtue of the arrangement described, the motor will always be prephased for proper subsequent movement in the opposite direction whenever such subsequent movement is demanded by the switch 89.

This manual movement is effected through the following mechanism: The motor shaft 76 is extended out through the end of the motor housing 77 opposite the valve. A sleeve 105 engages over the shaft 76 and is caused to rotate therewith by a pin 106. The sleeve 105 is shown in detail in Figs. 14 and 15 (Sheet 2). On the outer end of this sleeve is slipped a clutch element 107. This element is annular, but has a bar 108 extending diametrically thereacross. It likewise has clutch teeth 109 on its annular face opposite the bar 108.

Figure 14:
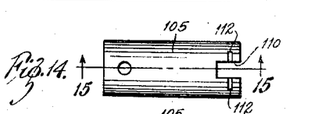
Fig. 14 is a view of a sleeve used in the indicator and manual operating means.
Figure 15:
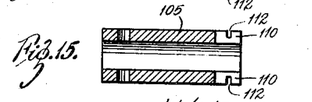
Fig. 15 is a longitudinal section of the sleeve taken on the line 15—15 of Fig. 14.

The sleeve 105 is provided with notches 110 extending a limited axial distance therein from the outer end of the sleeve (Fig. 14, Sheet 2). These notches 110 receive the bar 108 when the clutch collar 107 is slipped over the end of the sleeve. The engagement of the bar in the notches holds the collar against rotation relative to the sleeve and limits the inward movement of the clutch collar on the sleeve. After the collar has been thus disposed on the sleeve, a spring clip 111 of horseshoe shape (Fig. 9) is inserted into notches 112 (Figs. 14 and 15) to hold the clutch collar on the sleeve, the spring clip being warped for that purpose.

Figures 8, 9, 10, 11, 12, 16, 17, 18, 19, 20:
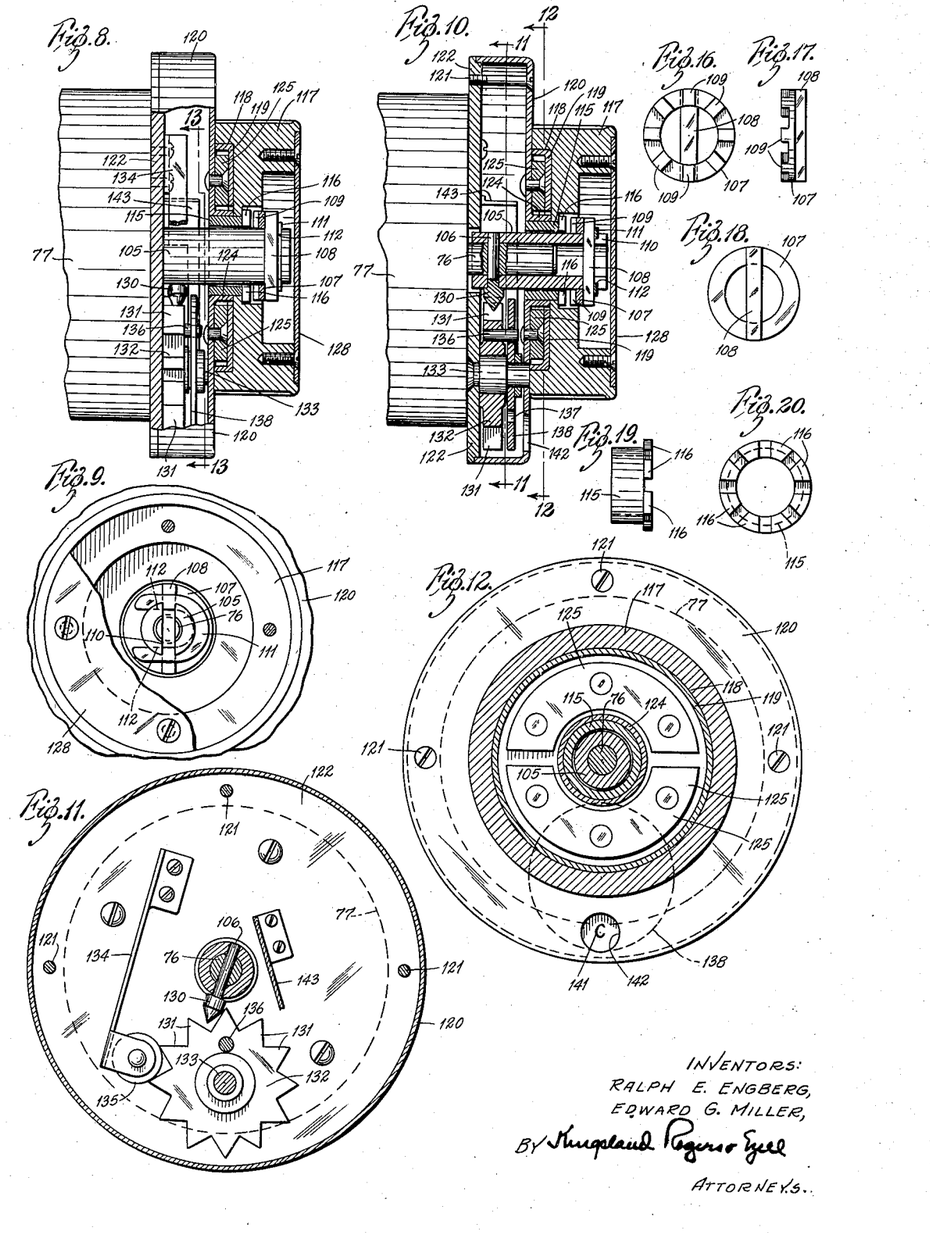
Fig. 8 (Sheet 3) is a partial longitudinal section of the manual reset mechanism and indicator.
Fig. 9 is a view from the right hand of Fig. 8, partly broken away.
Fig. 10 is a full longitudinal section through the manual operating mechanism and indicator.
Fig. 11 is a transverse section taken on the line 11—11 of Fig. 10.
Fig. 12 is a transverse section taken on the line 12—12 of Fig. 10.
Fig. 16 (Sheet 3) is a view of a toothed clutch member in the manual operating means.
Fig. 17 is an edge view of the device in Fig. 16.
Fig. 18 is a view of the toothed member taken from the right-hand side of Fig. 17.
Fig. 19 is a side view of a cooperating clutch member for the piece shown in Fig. 16.
Fig. 20 is a view from the right-hand side of Fig. 19 of the cooperating clutch member.

The other clutch element comprises a sleeve 115, shown in detail in Figs. 19 and 20 and shown in position in Figs. 8 and 10 (all on Sheet 3). This sleeve 115 has teeth 116 adapted to engage in the gaps between the tooth 109 of the clutch element 107 in a manner to be described.

The sleeve 115 is, when not engaged with the clutch element 107, rotatably mounted on the sleeve 105 that is secured to the motor shaft 76. The sleeve 115 is, likewise, secured to an operating knob 117, so as to move therewith. Hence, when the operating knob is moved axially outwardly, the two clutch elements will engage, so that rotation of the knob after such engagement will rotate the motor shaft to effect manual operation of the valve.

The operating knob 117 has an annular cut-out 118 in the bottom thereof into which is embedded and fixed a soft iron plate 119. A cup-shaped member 120 is attached by screws 121 to the end plate 112 of the motor housing 77. The member 120 provides a space outside of the end plate 122 to receive an indicator mechanism to be described. The member 120 has an outwardly turned flange 124 that receives the sleeve 115 to provide a bearing. Since the sleeve is integral with the knob 117, the flange 124 likewise forms a bearing for stabilizing the axial and rotary movement of the knob 117.

The soft iron member 119 embedded within the knob is shaped to provide an additional space between the member 120 and the radial portion of the member 119. Into this space are placed two permanent magnets 125, disposed with the poles of one adjacent opposite poles of the other.

Since the member 120 is fixed to the end plate 122 of the motor housing, and the magnets 125 are secured to the member 120, these magnets will normally draw the soft arm plate 119 and the knob attached thereto toward the member 120. This causes the clutch member 115 to be disengaged from the clutch member 107. The motor shaft 76 with the sleeve 105 and the clutch member 107 can rotate, but the knob will be held stationary. Consequently, there will be no exposed rotating parts during normal operation of the mechanism.

The knob is provided with a cover plate 128 which may be removed to give access to the clutch mechanism and associated parts.

An indicator mechanism is provided to operate off the motor shaft 76 by means of a pin head 130 forming an extension of the pin 106. This pin head rotates with the motor shaft 76. The pin head 130 engages the teeth 131 of a star wheel 132. This star wheel is freely rotatable on a stub shaft 133 secured to the end plate 122 of the motor housing. Each time the shaft 76 rotates, it will displace the wheel 132 the distance of one tooth. A leaf spring 134, secured at one of its ends to the end plate 122 (Fig. 11), has a roller 135 at its other end that engages the star wheel 132 to hold it in any position to which it has been moved by the pin 130.

The wheel 132 carries an eccentric pin 136 extending outwardly from one face thereof and operating within an arcuate slot 137 of an indicator wheel 138. When the motor operates in either direction until the pin 136 strikes one of the ends of the arcuate slot 137, the disc 138 will thereafter be displaced upon further movement of the indicator disc. The length of the slot 137 is predetermined so that the number of revolutions of the motor shaft 76 required to move the valve between its extreme positions will be slightly greater than enough to cause the pin 136 to displace the indicator disc. Thus after travel of the motor shaft almost to each extreme position, there will follow a slight displacement of the disc 138 upon completion of the travel.

Figure 13:
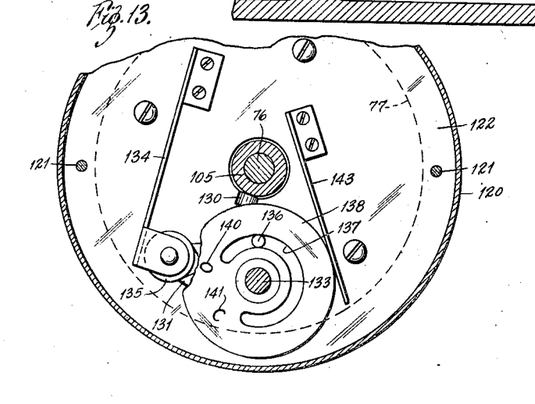
Fig. 13 (Sheet 2) is a transverse section taken on the line 13—13 of Fig. 8.

Just beyond both ends of the slot 137 are indexes 140 and 141 indicating the open or the closed position for the valve. These indexes are visible through an opening 142 (Figs. 10 and 12) in the member 120. In Figs. 10 and 13 the valve would be in an intermediate position. In Fig. 12, it is shown in closed position to accord with Figs. 3 and 7. The fact that the indicator does not shift its indication until the valve has completed its stroke assures the operator that full displacement thereof has occurred.

A leaf spring 143 is secured at one end to the cover 122 and at its free end bears against the periphery of the indicator disc 138 to hold that disc in any position to which it is moved.

A modified form of indicator is shown in Figs. 22–25. In these, the motor shaft 76 passes through the indicator casing 120 as before. It is pinned to the sleeve 105' beyond the casing 120, by the pin 106'. The sleeve 105' does not extend into the casing. The knob 17, clutch elements 107 and 115, magnets 125 and associated parts are the same as in Figs. 8–12.

Figure 22:
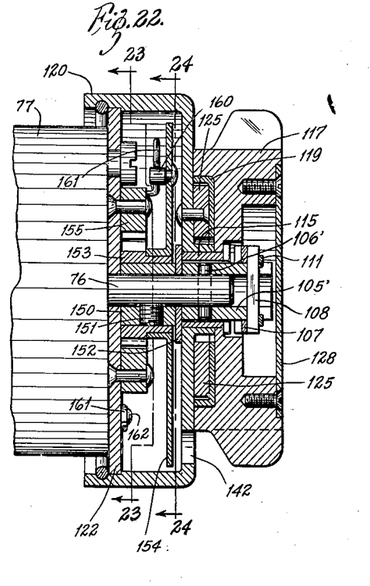
Fig. 22 (Sheet 4) is a diametrical section of a modified form of indicator and manual operator.
Figure 23:
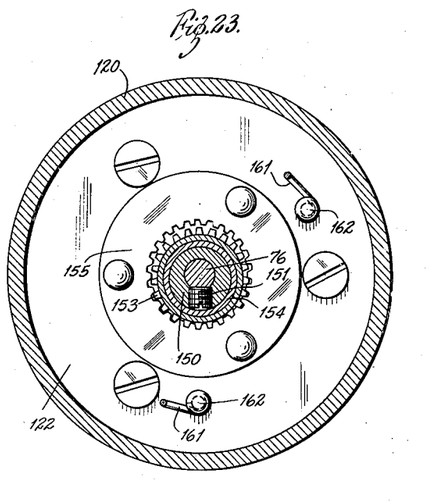
Fig. 23 is a transverse section on line 23—23 of Fig. 22.

On the motor shaft 76 and within the casing 120 is a cam 150, secured to the shaft by a set screw 151. A spacer disc 152 separates the cam from the sleeve 105'. The cam 150 is circular, but eccentric relative to the shaft. Fitting over the circular edge of the cam is a pinion 153 carrying an indicator disc 154, with suitable indicia registerable with the opening 142 in the casing 120.

The pinion 153 is freely rotatable on the cam, and engages with internal teeth on a ring gear 155 attached to the motor housing or end plate 122.

Suitable ratios of teeth are provided between the pinion 153 and the ring gear 155. For instance, the pinion may have 25 teeth and the ring gear 26 teeth, to give a reduction between the motor shaft and the pinion of 25 to 1. If 12 revolutions on the motor operate the valve between extreme positions, the extreme indicia on the indicator disc will be 180° apart.

As will be seen, this indicator also will operate whether the valve is automatically or manually operated. Of particular value in the latter is a feeler mechanism that will give the operator a touch sensation for the extreme positions of the valve. It comprises a pin 160 on the underside of the indicator disc, engageable with a shaped spring wire 161 secured to the motor end plate 122 as at 162.

Figures 24, 25:
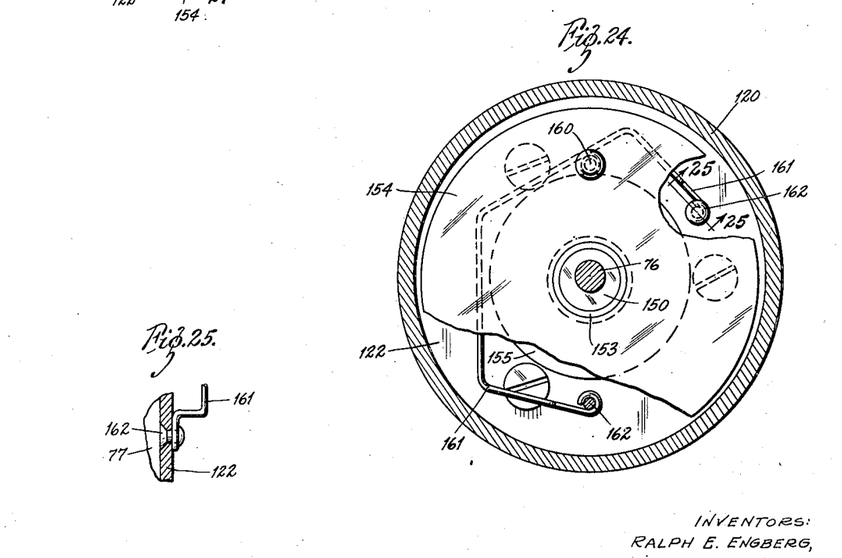
Fig. 24 is a transverse section on line 24—24 of Fig. 22.
Fig. 25 is a view of the spring attachment taken on line 25—25 of Fig. 24.

As shown in Fig. 24, the wire 161 is bent to extend radially inward for engagement by the pin 160 when the disc is moved to position wherein the valve is closed. It, therefore, retards movement of the disc, and motor shaft beyond such closed position of the valve, although it is resilient to permit such movement. It indicates to the operator, by touch, that the valve is closed.

Operation

This valve is adapted for many uses, as for instance, for the control of a fuel line, which it is desired under certain circumstances to open and in other circumstances to close, as by some automatic or remote control. For example, it might be desirable to open the valve when a fuel reservoir is empty and to close the same when the said reservoir is full. In such case, the member 92 could be operated by a float mechanism in the reservoir so that the switch 89 would be in the position shown in Fig. 21 when the reservoir is full, but would shift to the line 90 when the reservoir is empty.

Figure 1:
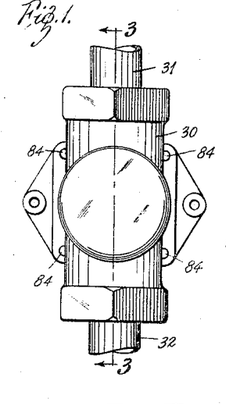
Fig. 1 (Sheet 1) is a view of one end of the valve.
Figures 2, 4:
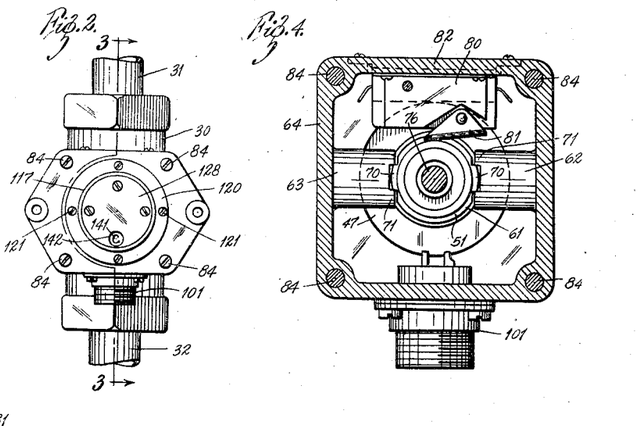
Fig. 2 is a view of the other end upon which is the manual control and indicator.
Fig. 4 is a transverse section taken at the right center of Fig. 3.
Figure 3:
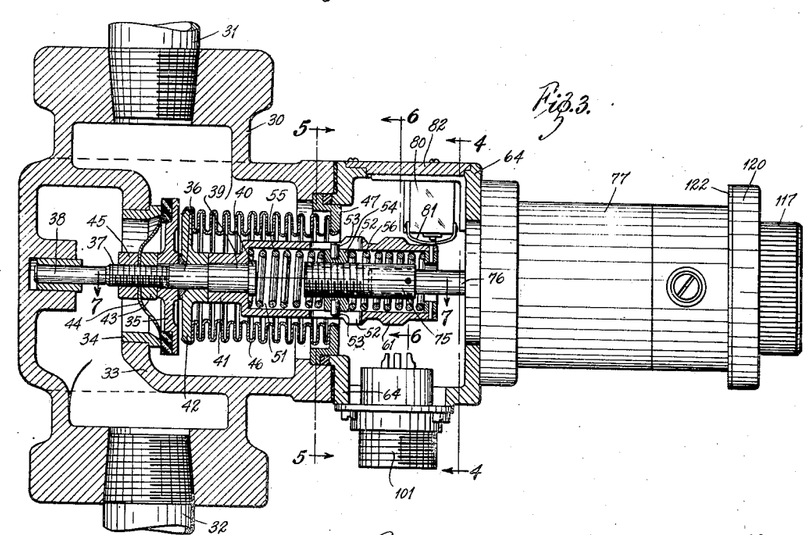
Fig. 3 is a partial diametrical section taken on the line 3—3 of Fig. 1.
Figure 5:
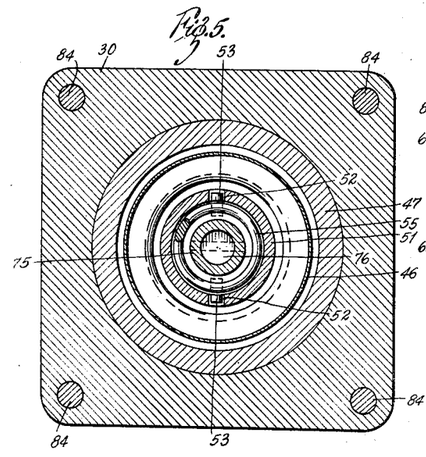
Fig. 5 (Sheet 2) is a transverse section taken at the left center of Fig. 3.

From the position shown in Fig. 21 (it being observed that the valve is open in Fig. 21 and closed in Fig. 3), upon shifting of the switch 89 to the line 90, a circuit will be established through the limit switch 80 to energize the coil 96. This operation of the motor will rotate the shaft 76 to turn the jack screw 75 and move the nut 54 toward the valve seat. Such displacement will be transmitted through the spring 55 to move the valve toward its seat. In so doing, it will first overcome the resistance of the springs forcing the balls 67 and 68 against the shallower side of the ridge 61. Meanwhile, the limit switch trigger 81 will have ridden across the top of the ridge 61 and will have started down the other inclined side thereof. The balls 67 and 68 will start down the inclined sides of the ridge 61 about the time that the trigger 81 has moved midway down its slope. At a point in the slope, preferably between the midposition and the bottom of the ridge, the trigger 81 will open the contacts 94 and 95, cutting off the motor, and will close the contacts 98 and 99 to cock the motor circuit for energizing the other motor coil 100 whenever the switch 89 shifts. The motor having come up to speed will have attained sufficient inertia to cause the jack screw to continue its movement after the switch 80 has shifted, so that it will continue movement. Thus, the valve will complete operation to its locked (closed) position with the balls 67 and 68 to the right (Fig. 7) of the ridge 61 and with the trigger 81 beyond the ridge 61, with the motor cut off. The balls 67 and 68 will be acting on the steeper side of the ridge 61, to apply force to aid in closing the valve and holding it closed, as shown in Figs. 3 and 7.

Thereafter, when the switch 89 shifts to the line 91, the motor will again be energized for operation in the opposite direction to open the valve. It will then operate the jack screw 75 to force the nut 54 toward open position of the valve, and the force thereof will be transmitted through the spring 56 to the valve. This will cause the balls to be displaced again up the inclined surface of the ridge 61. As this motion occurs, the ridge 61 will move toward the trigger 81, and ultimately lift the same to open the motor circuit. If the switch has a negative differential, as is preferable, it will not shift until it has been moved along the ridge to beyond its previous point of shifting. In any case, it should not shift until the inertia of the motor will be such as to cause the motor to continue operation to bring the valve and the balls 67 and 68 to the opening position, to the left of the ridge 61 (Fig. 7), wherein the valve will be locked by the action of the ball and socket mechanism.

Normally the limit switch will effect this end if it does not shift until the balls are well onto the flat crest of the ridge. While this is most easily obtained by a switch having negative differential, it can also be obtained by having the limit switch shift at the midpoint of the slope of the ridge 61, at which time the balls should be at the midpoint between the sloping sides of the ridge 61. The second ridge 60 functions primarily as a brake to prevent the detent sleeve 51 from jamming against the motor face during opening of the valve.

If the caps 69 are adjusted, they will vary the force of the springs 65 and 66. These springs in the closed position of the valve, bear constantly against the sloping edge of the ridge 61, so that they apply a force to close the valve. This closing force is varied by the aforesaid adjustment of the springs.

It will be seen that any override of the motor will merely compress the springs 55 or 56, thus avoiding damage to the mechanism.

If it be desired to operate the valve manually from either of its positions, the operator merely pulls out the knob 117 against the pull of the magnets 125, until the clutch elements engage, and then turns the knob to rotate the shaft manually. The operation of the locking mechanism or ball and socket devices and of the limit switch is independent of the means by which the motor shaft 76 is rotated. Consequently, upon completion of such manual operation, the mechanism will again be in phase with the external control 92. If this manual operation has been occasioned by a power failure, then upon restoration of power, the valve will automatically operate to the position proper for the condition of the external control 92.

If the manual operation involves a motor travel with consequent excess compression of one of the springs 55 or 56, these springs will be self-phasing, because upon subsequent operation in the other direction, the nut 54 will be moved to its proper position, relieving the excess compression, prior to the time that it begins displacement of the valve.

During any operation, manual or automatic, the indicator will work. Hence, the operator can tell at a glance the position of the valve, and in the case of manual operation, he will know when to stop rotation of the knob 117. Needless to say, after manual operation, when he releases the knob, the magnets 125 will draw it back to disengaged position of the clutch member.

It will be seen that the valve is explosion proof. The bellows, with the bellows head 42 sealed to the stem 36 as by solder, and with the washers between the housing 30 and the intermediate housing 64, effects a cell separating all of the fluid flow from the control mechanism, including the wiring. The valve is free of packing. It also provides a locking pressure adjustment accessible from the outside of the valve.

What is claimed is:

1. In a mechanism of the kind described, a valve member, mechanism for actuating the valve member to open and closed positions, said mechanism comprising power means selectively operable into two conditions, the first to move the valve in an opening direction and the second to move the valve in a closing direction, and a yieldable, resilient connecting means between the power means and the valve, said connecting means normally maintaining the power means and the valve in predetermined relationship, but yieldable to permit relative movement between them, a first control means adapted to control which condition of operability the power means shall have, said first control including a device displaceable from a first position in which it selects the first condition of the power means to a second position in which it selects the second condition of the same, means moved upon movement of the valve to establish the first position of the displaceable device when the valve is closed, and to shift the displaceable device to second position when the valve opens, and yieldable detent means in addition to the connecting means adapted to effect movement of the valve into either of its positions with a snap-action, and yieldable to maintain the valve in either of its two positions.

2. In a mechanism of the kind described, a valve, electrical means for moving the valve between open and closed positions, connections between the electrical means and the valve for producing movement of the valve by operation of the electrical means, yieldable detent means in addition to the connections for urging the valve into either position with a snap-action, and for yieldingly maintaining the valve in either closed or open position, means for displacing the yieldable means from one holding position during the first part of the travel of the valve and for enabling the detent means to move into its other holding position in the last part of travel of the valve, a single limit switch operable from first position when the valve is opened to a second position when it is closed, and means movable upon movement of the valve to shift the limit switch from its first position to its second position after the yieldable means has been displaced from its first holding position and not later than when the valve reaches its closed position, said limit switch in its first position being adapted to effect operation of the electrical means for moving the valve in a closing direction, and in its second position being adapted to effect operation of the electrical means for moving the valve in an opening direction.

3. In a mechanism of the kind described, a valve, electrical means for moving the valve between open and closed positions, connections between the electrical means and the valve for producing movement of the valve by operation of the electrical means, yieldable detent means in addition to the connections for yieldingly maintaining the valve in either closed or open position, means for displacing the yieldable means from one holding position during the first part of the travel of the valve and for enabling the detent means to move into its other holding position from the last part of travel of the valve, a single limit switch operable from first position when the valve is opened to a second position when it is closed, and means movable upon movement of the valve to shift the limit switch from its first position to its second position after the yieldable means has been displaced from its first holding position and not later than when the valve reaches its closed position, said means movable with the valve comprising a sloped cam surface engageable with the limit switch and shaped to hold the limit switch in its one position until the yieldable means has been overcome and shaped to shift the limit switch prior to positioning of the valve in its other position, said limit switch in its first position being adapted to effect operation of the electrical means for moving the valve in a closing direction, and in its second position being adapted to effect operation of the electrical means for moving the valve in an opening direction.

4. In a mechanism of the kind described, a valve member, a rotary electric motor having a first circuit for rotating in one direction, and a second circuit for rotating in the opposite direction, connecting means between the motor and the valve member for translating said rotary motions of the motor to displacing motion of the valve from open to closed position, a limit switch operable from a position to effect operation of the motor in one direction to a position to effect operation of the motor in the opposite direction, means movable with the valve to shift the limit switch from either position to the other position just prior to the time the valve reaches its other such position, whereby inertia of the motor may continue movement of the valve into its respective positions after the limit switch has shifted, yieldable detent means in addition to the connecting means adapted yieldingly to maintain the valve in either of its positions, said yieldable means being adapted to stop resistance to displacement of the valve before the limit switch has shifted, and manual means to rotate the motor.

5. In a mechanism of the kind described, a housing, a valve member therein, a rotary electric motor on the housing having a first circuit for rotating in one direction, and a second circuit for rotating in the opposite direction, means translating said rotary motions of the motor to displacing motion of the valve from open to closed position, a limit switch operable from a position to effect operation of the motor in one direction to a position to effect operation of the motor in the opposite direction, means movable with the valve to shift the limit switch from either position to the other position just prior to the time the valve reaches its other such position, whereby inertia of the motor may continue movement of the valve into its respective positions after the limit switch has shifted, yieldable detent means adapted yieldingly to maintain the valve in either of its positions, said yieldable means being adapted to stop resistance to displacement of the valve before the limit switch has shifted, and manual means to rotate the motor, said manual means being mounted on the housing, normally disengaged from the motor and being selectively engageable therewith.

6. In a mechanism of the kind described, a housing, a valve member therein, a rotary electric motor on the housing having a first circuit for rotating in one direction, and a second circuit for rotating in the opposite direction, means translating said rotary motions of the motor to displacing motion of the valve from open to closed position, a limit switch operable from a position to effect operation of the motor in one direction to a position to effect operation of the motor in the opposite direction, means movable with the valve to shift the limit switch from either position to the other position just prior to the time the valve reaches its other such position, whereby inertia of the motor may continue movement of the valve into its respective positions after the limit switch has shifted, yieldable detent means adapted yieldingly to maintain the valve in either of its positions, said yieldable means being adapted to stop resistance to displacement of the valve before the limit switch has shifted, manual means to rotate the motor, said manual means being mounted on the housing, normally disengaged from the motor and being selectively engageable therewith, and indicating means operated upon movement of the valve either by energization of the motor or by manual operation to indicate the position of the valve.

7. In a mechanism of the kind described, a valve member movable from open to closed position, ridge means on the valve member, a ball, yielding means urging the ball against the ridge means, said ridge means being displaced upon movement of the valve member whereby the ball may engage on either side thereof to lock the valve member yieldably in either of two positions, a limit switch operating means, and ridge means on the valve member adapted to engage the limit switch operating means to shift the same from a first position when the valve is closed to a second position when the same is open, said last-named ridge means and the limit switch operating means being disposed relative to the first-named ridge means and the ball so that the limit switch operating means will remain in a set position until the ball has surmounted the ridge in either direction of movement of the valve, and thereafter will shift to the other position.

8. In a mechanism of the kind described, a valve member movable from open to closed position, ridge means on the valve member, a ball, yielding means urging the ball against the ridge means, said ridge means being displaced upon movement of the valve member whereby the ball may engage on either side thereof to lock the valve member yieldably in either of two positions, a limit switch operating means, ridge means on the valve member adapted to engage the limit switch operating means to shift the same from a first position when the valve is closed to a second position when the same is open, said last-named ridge means and the limit switch operating means being disposed relative to the first-named ridge means and the ball so that the limit switch operating means will remain in a set position until the ball has surmounted the ridge in either direction of movement of the valve, and thereafter will shift to the other position, and means to adjust the force of the means urging the ball against the ridge means, said ridge means having a sloping side for engagement with the ball whereby adjustment as aforesaid will vary the closing force applied to the valve.

9. In a mechanism of the kind described, a valve, a power-driven rotary shaft, a jack screw on the said shaft and rotatable therewith, a nut operable by the jack screw, a pair of compression springs disposed on opposite sides of the nut and each engaging the valve member, and means to prevent rotation of the nut relative to the valve member but permitting axial movement relative thereto whereby rotation of the jack screw may displace the nut and through one or the other of the springs effect displacement of the valve member.

10. In a mechanism of the kind described, a device movable from a first to a second position, a rotary motor for thus moving the device and adapted to rotate a plurality of times in each such movement, indicating means operated from the motor shaft to indicate the position of the device, said indicating means comprising a member displaced a limited distance upon each rotation of the motor shaft and adapted to be displaced a predetermined distance by operation of the motor sufficiently to shift the device from said first to said second position, a second member having indicia thereon, and means for connecting the first member to the second member, said means engaging the second member for displacement thereof only when the first member approaches one of the extremes of its entire movement.

11. In a mechanism of the kind described, a device movable from a first to a second position, a rotary motor for moving the device and adapted to rotate a plurality of times in each such movement, indicating means operated from the motor shaft to indicate the position of the device, said indicating means comprising a member displaced a limited distance upon each rotation of the motor shaft and adapted to be displaced a predetermined distance by operation of the motor sufficiently to shift the device from first to second position, a second member having indicia thereon, means for connecting the first member to the second member, said means engaging the second member for displacement thereof only when the first member approaches one of the extremes of its entire movement, and means for manually rotating the motor shaft to manually displace the device, said last-named means also effecting operation of the indicator.

12. In a mechanism of the kind described, a rotary shaft, an element rotated thereby, a star wheel adapted to be rotated a limited distance upon each rotation of the element, means yieldably to hold the star wheel in any of its positions, a pin on the star wheel, an indicator disc rotatably mounted concentrically with the star wheel, a slot in the indicator disc into which the pin engages, said slot having an arcuate length so that the pin is free to move in said slot without displacing said disc for a predetermined number of revolutions of the motor shaft, but so that the pin will displace the indicator disc upon additional revolutions of the motor shaft beyond such number, and means for yieldably maintaining the indicator disc in any of its positions.

13. In a mechanism of the kind described, a motor, an operated device operated by the motor through a motor shaft, to a predetermined position, manual means for turning the motor shaft, a member rotated by the motor shaft, and a yieldable means separate from said operated device, said means being resistingly engageable with the member when the operated device has attained its predetermined position to indicate that condition to the hand operating the manual means.

14. In a mechanism of the kind described, an electrical motive means adapted to be operated in forward and reverse directions, actuated means adapted for forward and reverse movement into opposite positions by the motive means, and means connecting the motive means and the actuated means for operation of the latter by the former, said connecting means including means permitting relative movement between the motive means and the actuated means, yieldable detent means adapted to apply a quick-acting force to the actuated means to cause the same to snap into one position and to be yieldably retained therein, limit switch means to reverse the electrical connections of the motive means, said limit switch means being of the snap-action type, and means to cause the limit switch means to operate only after the motive means has moved sufficiently to overcome the effect of the detent means.

15. In a mechanism of the kind described, an electrical motive means adapted to be operated in forward and reverse directions, actuated means adapted for forward and reverse movement into opposite positions by the motive means, and means connecting the motive means and the actuated means for operation of the latter by the former, said connecting means including means permitting relative movement between the motive means and the actuated means, yieldable detent means adapted to apply a quick-acting force to the actuated means to cause the same to snap into each of its positions and to be yieldably retained therein, there being a neutral position between the two positions, limit switch means operable as the actuated means moves toward each position to reverse the electrical connections of the motive means for operation thereof in the reverse direction, said limit switch means being of the snap-action type, for quick-action into each of its positions, and there being a neutral position between the two positions, and means to cause operation of the limit switch means only after the motive means has moved in either direction sufficiently to overcome its detent means.

16. In a mechanism of the kind described, an electrical motive means adapted to be operated in forward and reverse directions, actuated means adapted for forward and reverse movement into opposite positions by the motive means, and means connecting the motive means and the actuated means for operation of the latter by the former, said connecting means including means permitting relative movement between the motive means and the actuated means, yieldable detent means adapted to apply a quick-acting force to the actuated means to cause the same to snap into each of its positions and to be yieldably retained therein, there being a neutral position between the two positions, limit switch means operable as the actuated means moves toward each position to reverse the electrical connections of the motive means for operation thereof in the reverse direction, said limit switch means being of the snap-action type, for quick-action into each of its positions, and there being a neutral position between the two positions, and means to cause operation of the limit switch means only after the motive means has moved in either direction sufficiently to overcome its detent means, said last-named means including a member on the connecting means adapted to be moved across the limit switch means to displace and to release the same as the connecting means moves back and forth, said member being disposed to engage the limit switch means to operate the same only when the detent means is sufficiently near to its position to effect final action of the actuated means with a snap, so that the continued movement of the actuated means may be effected by said detent means.

17. In a mechanism of the kind described, an electrical motive means adapted to be operated in forward and reverse directions, actuated means adapted for forward and reverse movement into opposite positions by the motive means, and means connecting the motive means and the actuated means for operation of the latter by the former, said connecting means including means permitting relative movement between the motive means and the actuated means, yieldable detent means adapted to apply a quick-acting force to the actuated means to cause the same to snap into each of its positions and to be yieldably retained therein, there being a neutral position between the two positions, limit switch means operable as the actuated means moves toward each position to reverse the electrical connections of the motive means for operation thereof in the reverse direction, said limit switch means being of the snap-action type, for quick action into each of its positions, and there being a neutral position between the two positions, and means to cause operation of the limit switch means only after the motive means has moved in either direction sufficiently to overcome its detent means, said last-named means including an elevated portion and an indented portion on the connecting means, said portions being joined by a sloping surface, said limit switch means having an actuator adapted to be engaged and displaced by the sloping surface as the connecting means is moved, whereby to shift said actuator to reverse the limit switch means, and said limit switch means being adapted to be actuated at a point on the surface for one direction of movement different from that for the opposite direction.

18. In a mechanism of the kind described, an electrical motive means adapted to be operated in forward and reverse directions, actuated means adapted for forward and reverse movement into opposite positions by the motive means, and means connecting the motive means and the actuated means for operation of the latter by the former, said connecting means including means permitting relative movement between the motive means and the actuated means, said connecting means having a first elevated portion and a first indented portion, and a second elevated portion and a second indented portion, snap-action means comprising a spring pressed element engageable with the first elevated and indented portions to effect snap-action of the actuated means into one position, limit switch means operable by the second elevated and indented portions to be shifted to reverse the electrical connections of the motive means, said limit switch means being of the snap-action type, said elevated and indented portions being so related that the limit switch cannot be shifted until the motive means has displaced the connecting means so that it may come under the influence of the snap-action means of the actuated member.

19. In a valve construction, a valve housing having a valve seat, a valve element cooperable with said seat, a valve stem device extending through the valve element, means securing the valve element to the stem, a flexible sealing envelope, a head to which one end of the envelope is secured, said stem passing through the head and the envelope and the head being removably secured thereto, sealing means between the head and the stem, a partition to which the other end of the envelope is sealed, said partition being removably held onto the housing, a mechanism receiving casing attached to the housing, means sealing the partition and the casing, the stem extending into the casing, electrical mechanism in the casing to effect operation of the stem and valve, said mechanism being sealed from the valve housing.

20. In a mechanism of the kind described, a housing, a motive means adapted to produce movements in opposite directions, a device in the housing to be actuated oppositely by the motive means, a connection between the motive means and the device, said connection including resilient force transmitting means for transmitting said movements in both directions, snap-action means operating on the actuated device, adapted to yieldably hold the device in either position into which it is operated, said snap-action means including an elevated element and indentations on opposite sides thereof arranged in the direction of movement of the actuated device, and a spring pressed element engageable thereon, one of said elements of said snap-action means being on the actuated device and the other on the housing, a second elevated element and an indentation on one side thereof also arranged in the direction of movement of the actuated device, and a switch means for controlling the motive means, said switch means including a switch actuating element, one of said last two elements being on the actuated device and the other on the housing.

21. In a mechanism of the kind described, a housing, a valve means therein operable between closed and open positions, motive means for oppositely moving the valve, and connecting means between the motive means and the valve, snap-action means for the valve including a ridge element with sloping sides on opposite sides thereof, and a spring pressed element adapted to ride over the sloping sides and the ridge element during movement of the valve, the spring pressed element being engageable on the first sloping side when the valve is closed, and the second as it opens, the first sloping side being steeper than the other, and one of said snap-action elements being on the housing and the other on the valve means.

22. In a mechanism of the kind described, a casing, a shaft rotatable therein, manual means to rotate the shaft, an element rotated thereby, indicating means including a visual indicator on the element and an index on the casing, and means applying a resistance to manual rotation of the shaft as the rotated element causes its indicator to approach said index.

23. In a mechanism of the kind described, a motor housing, a motor therein having a rotating shaft, a device to be actuated thereby, means connecting the device with one end of the shaft, the other end of the shaft projecting from the motor, indicating means disposed at said other end of the shaft and connected thereto to indicate the position of the actuated device, and manual means for turning the shaft, said manual means being supported adjacent said other end of the shaft and engageable therewith to rotate the shaft and to operate the indicating means.

24. In a mechanism of the kind described, a motor housing, a motor therein having a rotating shaft, a device to be actuated thereby, means connecting the device with one end of the shaft, the other end of the shaft projecting from the motor, indicating means disposed at said other end of the shaft and connected thereto to indicate the position of the actuated device, and manual means for turning the shaft, said manual means being supported adjacent said other end of the shaft and engageable therewith to rotate the shaft and to operate the indicating means, said manual means comprising an element on the shaft outside the indicating means connection and movable axially therealong, a clutch element on the manual means and a cooperable clutch element on the shaft, and means for urging said elements out of engagement.

25. In a mechanism of the kind described, a motor housing, a motor therein having a rotating shaft, a device to be actuated thereby, means connecting the device with one end of the shaft, the other end of the shaft projecting from the motor, indicating means disposed at said other end of the shaft and connected thereto to indicate the position of the actuated device, and manual means for turning the shaft, said manual means being supported adjacent said other end of the shaft and engageable therewith to rotate the shaft and to operate the indicating means, said manual means comprising an element on the shaft outside the indicating means connection and movable axially therealong, a clutch element on the manual means and a cooperable clutch element on the shaft, and means for urging said elements out of engagement, said urging means comprising a magnetic element and an armature element, one of which is on the motor housing and the other on the manual means.

26. In a mechanism of the kind described, a motor, an operated device operated by the motor, to a predetermined position, manual means for turning the motor shaft, a member rotated by the motor shaft, and a yieldable means engageable with the member when the operated device has attained its predetermined position to indicate that condition by resistance to operation of the manual means, said yieldable means comprising a spring urged element having a portion in the path of the rotated member and engageable thereby only at a critical point in the position of the member.

27. In a mechanism of the kind described, a motor, an operated device operated by the motor, to a predetermined position, manual means for turning the motor shaft, a member rotated by the motor shaft, and a yieldable means engageable with the member when the operated device has attained its predetermined position to indicate that condition by resistance to operation of the manual means, said yieldable means comprising a spring urged element having two portions separately disposed in the path of the rotated member at critical points in the position of the member, said spring urged element being yieldable resistingly to permit passage of the member and to indicate engagement by touch.

28. In a mechanism of the kind described, a valve, a motor operable to produce opening and closing movements of the valve, yieldable resilient connections between the motor and the valve for moving the valve upon operation of the motor, yieldable detent means in addition to the connections, operable to urge the valve into each of its positions, the detent means being required to be overcome before the valve may be moved out of such position, limit switch means connected with the motor and movable to select whether the motor can open or close the valve, and means movable with movement of the valve to shift the limit switch from either position to its other position just prior to the time the valve reaches its other such position whereby the inertia of the motor may continue movement of the valve and it may be moved into its respective positions after the limit switch has shifted.

29. In a mechanism of the kind described, a valve, a motor operable to produce opening and closing movements of the valve, yieldable resilient connections between the motor and the valve for moving the valve upon operation of the motor, yieldable detent means in addition to the connections, operable to urge the valve into each of its positions, the detent means being required to be overcome before the valve may be moved out of such position, limit switch means connected with the motor and movable to select whether the motor can open or close the valve, means movable with movement of the valve to shift the limit switch from either position to its other position just prior to the time the valve reaches its other such position whereby the inertia of the motor may continue movement of the valve and it may be moved into its respective positions after the limit switch has shifted, and means to overcome the detent means before the limit switch has shifted.

30. In a mechanism of the kind described, a motor housing, a motor therein having a rotating shaft, a device to be actuated thereby, means connecting the device with one end of the shaft, the other end of the shaft projecting from the motor, indicating means disposed at said other end of the shaft and connected thereto to indicate the position of the actuated device, manual means for turning the shaft, said manual means being supported adjacent said other end of the shaft and engageable therewith to rotate the shaft and to operate the indicating means, and means normally but yieldably maintaining the manual means out of engagement with the shaft.

31. In a mechanism of the kind described, a motor housing, a motor therein having a rotating shaft, a device to be actuated thereby, means connecting the device with one end of the shaft, the other end of the shaft projecting from the motor, indicating means disposed at said other end of the shaft and connected thereto to indicate the position of the actuated device, manual means for turning the shaft, said manual means being supported adjacent said other end of the shaft and engageable therewith to rotate the shaft and to operate the indicating means, and means normally but yieldably maintaining the manual means out of engagement with the shaft, said means comprising attracting magnetic elements, one on the manual means and one supported on the housing.

EDWARD G. MILLER.
RALPH E. ENGBERG.

REFERENCES CITED

The following references are of record in the file of this patent:

UNITED STATES PATENTS

| Number | Name | Date |
|---|---|---|
| 450,588 | Lunkenheimer | Apr. 14, 1891 |
| 467,796 | Ferrell | Jan. 26, 1892 |
| 468,242 | Ferell | Feb. 2, 1892 |
| 600,884 | Moon | Mar. 22, 1898 |
| 1,141,647 | Merk | June 1, 1915 |
| 1,173,764 | Baldwin | Feb. 29, 1916 |
| 1,264,282 | Dearing | Apr. 30, 1918 |
| 1,480,942 | McKee | Jan. 15, 1924 |
| 1,512,192 | Benko | Oct. 21, 1924 |
| 1,571,401 | Erickson | Feb. 2, 1926 |
| 1,692,406 | Fuller | Nov. 20, 1928 |
| 1,696,178 | Ahlm | Dec. 25, 1928 |
| 1,722,412 | Eisenhauer | July 30, 1929 |
| 1,768,625 | Olsen | July 1, 1930 |
| 1,770,912 | Clapp | July 22, 1930 |
| 1,777,115 | Bruback | Sept. 30, 1930 |
| 1,931,791 | Dueringer | Oct. 24, 1933 |
| 1,974,335 | Kimball | Sept. 18, 1934 |
| 1,985,449 | Heggon | Dec. 25, 1934 |
| 1,989,942 | Parks | Feb. 5, 1935 |
| 1,996,309 | Simpson | Apr. 2, 1935 |
| 2,005,891 | Elberty | June 25, 1935 |
| 2,111,424 | Goff | Mar. 15, 1938 |
| 2,118,792 | Horton | May 24, 1938 |
| 2,148,817 | Kamenarovic | Feb. 28, 1939 |
| 2,167,321 | Abercrombie | July 25, 1939 |
| 2,213,741 | Mihalyi | Sept. 3, 1940 |
| 2,252,670 | Demarest et al. | Aug. 12, 1941 |
| 2,309,478 | Rau | Jan. 26, 1943 |
| 2,315,389 | Benson | Mar. 30, 1943 |
| 2,339,421 | Newell | Jan. 18, 1944 |

FOREIGN PATENTS

| Number | Country | Date |
|---|---|---|
| 6,835 | Great Britain | Apr. 3, 1895 |
| 172,084 | Great Britain | Nov. 24, 1921 |
| 211,710 | Switzerland | 1941 |